United States Patent
Casciato, Jr.

(10) Patent No.: US 6,905,290 B1
(45) Date of Patent: Jun. 14, 2005

(54) HAND RASP WITH GROOVE BLADE AND ADJUSTABLE GUIDE FOR SCORING CONSTRUCTION MATERIAL

(76) Inventor: Andrew Casciato, Jr., 5107 Hayes Rd., Ravenna, OH (US) 44266

( * ) Notice: Subject to any disclaimer, the term of this patent is extended or adjusted under 35 U.S.C. 154(b) by 51 days.

(21) Appl. No.: 10/664,131

(22) Filed: Sep. 22, 2003

(51) Int. Cl.$^7$ .............................................. B23D 67/12
(52) U.S. Cl. .................... 407/29.15; 30/164.9; 30/294; 144/136.95; 144/154.5; 451/512; 451/524; 451/557
(58) Field of Search ........................... 407/29.1, 29.14, 407/29.15, 29.11; 409/304; 144/154.5, 136.95, 144/114.1; 451/512, 523, 524, 525, 557, 451/558, 344; 30/164.9, 293, 294; 81/9.2

(56) References Cited

U.S. PATENT DOCUMENTS

| | | | | |
|---|---|---|---|---|
| 1,158,648 A | * | 11/1915 | De Ayala | 30/486 |
| 1,432,035 A | * | 10/1922 | Potter | 30/481 |
| 1,956,275 A | * | 4/1934 | Cook | 30/293 |
| 2,701,416 A | * | 2/1955 | Snyder | 30/293 |
| 2,734,535 A | * | 2/1956 | Neubauer | 30/481 |
| 3,934,287 A | * | 1/1976 | Howard | 7/158 |
| 3,991,429 A | * | 11/1976 | Honauer | 7/158 |
| 4,180,908 A | * | 1/1980 | Beermann | 30/279.6 |
| 4,290,719 A | * | 9/1981 | Worthington et al. | 409/180 |
| 4,669,970 A | | 6/1987 | Perry | |
| 5,040,297 A | * | 8/1991 | Scheinost | 30/487 |
| D333,600 S | | 3/1993 | Brandvold | |
| 5,353,508 A | * | 10/1994 | Baker | 33/42 |
| 5,937,600 A | | 8/1999 | Larson | |
| 5,979,058 A | | 11/1999 | Henke | |
| 6,032,320 A | | 3/2000 | McComber et al. | |
| 6,095,435 A | | 8/2000 | Greer, Jr. et al. | |
| 6,223,384 B1 | | 5/2001 | Kuhlen | |
| 6,296,558 B1 | * | 10/2001 | Poole et al. | 451/557 |
| D453,672 S | | 2/2002 | McCoy | |
| 6,415,472 B1 | | 7/2002 | Williams | |
| 2002/0148121 A1 | * | 10/2002 | LeBlanc | 30/388 |

FOREIGN PATENT DOCUMENTS

WO     WO 99/30558     *   6/1999    .......... A01L 11/00

* cited by examiner

Primary Examiner—Daniel W. Howell
Assistant Examiner—Michael W. Talbot
(74) Attorney, Agent, or Firm—John D. Gugliotta; Olen L. York, III

(57) ABSTRACT

An improved hand rasp comprises a planar plate with an anterior surface and an opposing posterior surface. An ergonomic handle is affixed to the anterior surface of the plate. A groove blade is removably affixed to the posterior surface of the plate by attachment means. The groove blade may have a variety of geometric configurations and varying in width and depth to accommodate the imagination of the user or designer. The groove blade includes an abrasive surface on the exterior surface of the groove blade. A guide is also removably affixed to the posterior surface of the plate by attachment means, positioned parallel to the groove blade. The guide is adjustable about apertures formed in the plate to position the guide closer to or farther away from the groove blade.

20 Claims, 9 Drawing Sheets

HAND RASP WITH GROOVE BLADE AND ADJUSTABLE GUIDE FOR SCORING CONSTRUCTION MATERIAL

RELATED APPLICATIONS

The present invention was first described in Disclosure Document Registration 515,541 filed on Jul. 25, 2002 under 35 U.S.C. §122, 37 C.F.R. §1.14 and MPEP § 1706. There are no previously filed, nor currently any co-pending applications, anywhere in the world.

BACKGROUND OF THE INVENTION

1. Field of the Invention

The present invention relates generally to construction hand tools, and more particularly, a hand rasp with a groove blade for scoring surfaces, such as exterior insulation, so that functional and/or decorative grooves may be placed therein.

2. Description of the Related Art

A wide variety of hand tools have been developed and are currently available for scoring/etching grooves, and functional and/or decorative designs in construction material. Particularly, a variety of hand saws, rasps, utility knives and electrical hot knives are used to score, etch or groove exterior finish insulation systems (hereinafter "EFIS") in preparation for subsequent coats of cement or mortar.

EFIS is an insulating material generally manufactured from polystyrene (or other similar material, such as available by the trade name STYROFOAM®) mounted to the skeletal frame of a building under construction. EFIS provides not only insulation to the building, but also a foundation for the exterior finish that will be prominently visible to patrons upon completion. After installation of EFIS, the insulation surface is smoothed by sanding. After sanding, the insulation must be scored, etched or grooved to accommodate functional and/or decorative markings required by building code or aesthetic design. For instance, if a large area of insulation has been applied to the building frame, it is often necessary to provide a starting/stopping point so that the application of subsequent coats of cement or mortar has a seamless visual appearance. Without starting/stopping points, the application of subsequent coats will appear messy and non-uniform, and may require complete re-work of the area. If functional grooves are required, such as a "drip-edge", a precision score or etch must be applied to the insulation to prevent water from returning along a horizontal surface and then accumulating along a wall or the substructure, thereby damaging the wall or substructure. Decorative grooves, such as geometric designs or trade name indicia popular among commercial shops, are formed and defined by scoring/etching the insulation in the desired manner.

To install the aforementioned starting/stopping points (hereinafter "breaks"), or other functional and/or decorative grooves, many construction professionals employ hand saws, hand rasps or electrical hot knives to score, etch or groove the insulation. However, each of the aforementioned categories of hand tool suffers from certain deficiencies that render such use economically wasteful (in terms of time spent and impreciseness of tools leading to waste of construction materials) and/or unintentionally dangerous to use as required. These deficiencies are particularly acute and pronounced when construction proceeds at elevated heights, especially on scaffolding or extension ladders. The clumsiness of hand saws, with elongated and dangerously sharp blades, and hand rasps forces construction professionals to focus on several competing concepts at once, including safely using the tools, precisely scoring the insulation, and maintaining balance at the elevated height. To alleviate the concern for safety, time is spent harnessing the user into a safety apparatus so that loss of balance does not equal loss of life or severe bodily injury. However, the time spent harnessing the user, positioning the user, and then releasing the user from the harness is an inefficient and ineffective expenditure of valuable resources to the construction company, both in finances and time. Furthermore, to safely use these devices and precisely score the required grooves generally requires years of experience and expensive trial and error in coping with the conditions presented.

The electrical hot knife presents other additional problems as compared to manual hand tools. The electrical hot knife requires connection to an electrical source, generally accomplished by running a substantially long electrical cord from outlet to hot knife. At elevated working heights, the construction professional must negotiate the electrical cord, which often is approaching the professional from the feet and presents an increased likelihood of tripping or disconnecting the power from the hot knife. The precision of the blades in forming grooves is ultimately in the skilled hands of a user, but often minor misjudgments result in irreparable damage to the insulation. The imprecision of scoring insulation is further compounded if awkward angles of engagement are required, such as overhead use. Furthermore, the blades affixed to the hot knife for cutting varying configurations are manufactured from thin metal that is easily deformed and must be replaced often to ensure precise scoring. The necessity for repeated replacement of the blades creates additional expense, as each blade generally costs about twelve dollars ($12.00). The deformation of the blades causes imprecise scoring of the insulation, causing further delays and additional expenses. In addition, the blades are extremely hot and present potential burn injuries and/or damage to person or object during operation.

A search of the prior art did not disclose any patents that read directly on the claims of the instant invention; however, the following references were considered related:

U.S. Pat. No. 4,669,970, issued in the name of Perry, discloses a hand tool for finishing corners with a cement material comprising an arcuately disposed plate for providing rounded corners;

U.S. Pat. No. 5,937,600, issued in the name of Larson, discloses a drip channel for use in the construction of exterior wall systems;

U.S. Pat. No. 5,979,058, issued in the name of Henke, discloses a multi-purpose contracting hand tool comprising a handle and a blade;

U.S. Pat. No. 6,032,320, issued in the name of McComber et al., discloses a trowel having imposed blade stresses imposed on the bottom and top working surfaces;

U.S. Pat. No. 6,095,435, issued in the name of Greer, Jr., et al., discloses an applicator system and method for stucco material comprising a dispensing assembly and a cartridge assembly;

U.S. Pat. No. 6,223,384, issued in the name of Kuhlen, discloses a trowel with a handle, wherein the handle does not possess a convention tang running in a longitudinal direction of the handle;

U.S. Pat. No. 6,415,472, issued in the name of Williams, discloses a circular edging tool for concrete, wherein the tool has a concave lip;

U.S. Patent No. Des. 333,600, issued in the name of Brandvold, discloses an ornamental design for a concrete groover having a V-shaped shaft; and U.S. Patent No. Des. 453,672, issued in the name of McCoy, discloses an ornamental design for a sanding and cleaning device for drywall bullnose cornerbeads.

Consequently, there exists a continuous need for new ideas and enhancements for existing products in the construction hand tool industry, especially the hand rasp disclosed herein that overcomes the deficiencies of presently available hand tools disclosed, thus providing an improved tool that is easy to use and maintain, cost effective for on-site use, and durable to withstand repeated usage in a variety of environments.

SUMMARY OF THE INVENTION

It is therefore an object of the present invention to provide an improved hand rasp for scoring or etching grooves into insulation surfaces, such as EFIS.

It is a further object of the present invention to provide an improved hand rasp for scoring or etching grooves into cement or mortar finishes applied to EFIS as a final exterior coat.

It is a further object of the present invention to provide an improved hand rasp that is hand held and does not necessitate the connection of electrical power thereto.

It is a feature of the present invention to provide an improved hand rasp having a handle affixed to a plate, wherein the handle is ergonomically designed to reduce stress on a user's hand, wrist, arms and shoulders.

It is a further feature of the present invention to provide an improved hand rasp having a groove blade removably affixed to the plate, wherein the groove blade is an elongated body substantially traversing the plate.

It is a further feature of the present invention to provide an improved hand rasp having a plurality of groove blades formed in a plurality of geometric shapes, including triangulated, orthogonal, arcuate, trapezoidal and beveled shapes, thereby providing great versatility in the style and/or shape of grooves that are scored into insulation.

It is a further feature of the present invention to provide an improved hand rasp wherein the orthogonal, arcuate, trapezoidal and bevel-shaped groove blades include an elongated body with one terminal end having an angular recess, the angular recess provided so that the groove blade may smoothly start scoring or etching the insulation without tearing the outlying target area.

It is a further feature of the present invention to provide an improved hand rasp having a guide removably and adjustably affixed to the plate substantially traversing the plate and lying parallel to the groove blade, wherein the guide is adjustable so as to increase or decrease the distance between the guide and the groove blade, and wherein the guide is completely removably and the edge of the hand rasp may be used as a guide in combination with a straight-edge device, such as a carpenter's level.

It is a further feature of the present invention to provide an improved hand rasp having incremental hash markings along the underside of the plate, wherein the markings define the distance between the groove blade and guide for easy alignment at a specified space therebetween.

Briefly described according to one embodiment of the present invention, an improved hand rasp comprises a planar plate with an anterior surface and an opposing posterior surface. A handle is affixed, either permanently or semi-permanently, to the anterior surface of the plate, and is envisioned to have an ergonomical configuration intended to reduce or eliminate stress exerted on the hand, wrist, arm and shoulders. A groove blade is removably affixed to the posterior surface of the plate by attachment means, such as threaded bolts and wing-nuts. The groove blade may have a variety of geometric configurations and varying in width and depth to accommodate the imagination of the user or designer. The groove blade includes an abrasive surface that may comprise an abrasive surface or layer, such as sandpaper, adhered to the exterior surface of the groove blade. The abrasive surface may also be integrally manufactured therein. A guide is also removably affixed to the posterior surface of the plate by attachment means, positioned parallel to the groove blade. The guide is adjustable about apertures formed in the plate to position the guide closer to or farther away from the groove blade.

The hand rasp, having a guide and a groove blade, provides a hand tool intended to score or etch insulation surfaces (like EFIS) with functional or decorative grooves, wherein the hand tool overcomes the deficiencies and shortcomings of the prior art discussed. In particular, the hand rasp with the guide and groove blade is easy to hold and manipulate, thereby reducing the potential for injury to a user or damage to the device or construction materials. The hand rasp does not require electricity, thus awkward electrical cords are avoided. The durability of the hand rasp, because of the metallic materials from which it is constructed, reduce cost and promote efficiency in the work environment. As such, and for the reasons previously described, the hand rasp disclosed and claimed in the present invention overcomes the deficiencies of hand tools presently available.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5b is a front view of FIG. 5a;

FIG. 6c is a front view of FIG. 6a;

FIG. 7c is a front view of FIG. 7a;

FIG. 8c is a front view of FIG. 8a;

FIG. 9c is a front view of FIG. 9a; and

DESCRIPTION OF THE PREFERRED EMBODIMENTS

The best mode for carrying out the invention is presented in terms of its preferred embodiment, herein depicted within FIGS. 1 through 10.

1. Detailed Description of the Figures

Figure 1:
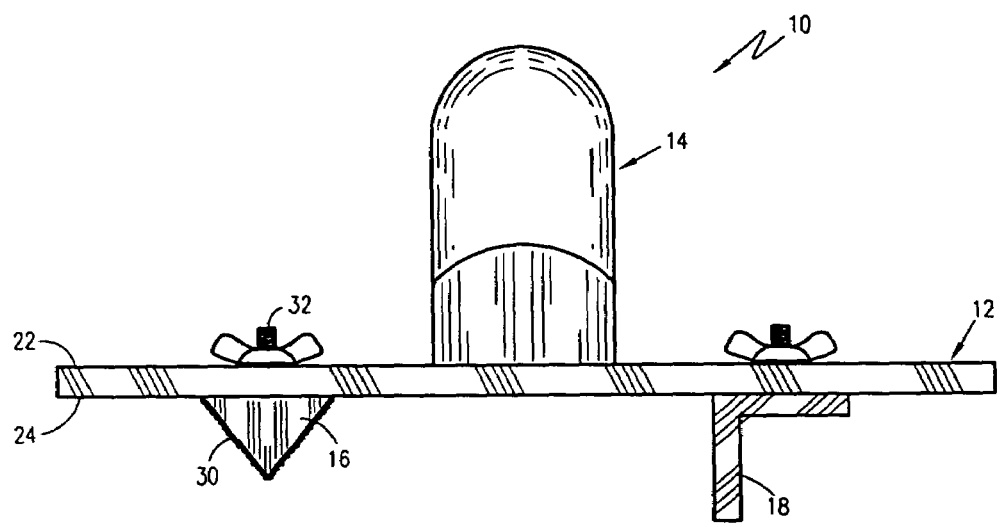
FIG. 1 is a front plant view of the hand rasp.
Figure 2:
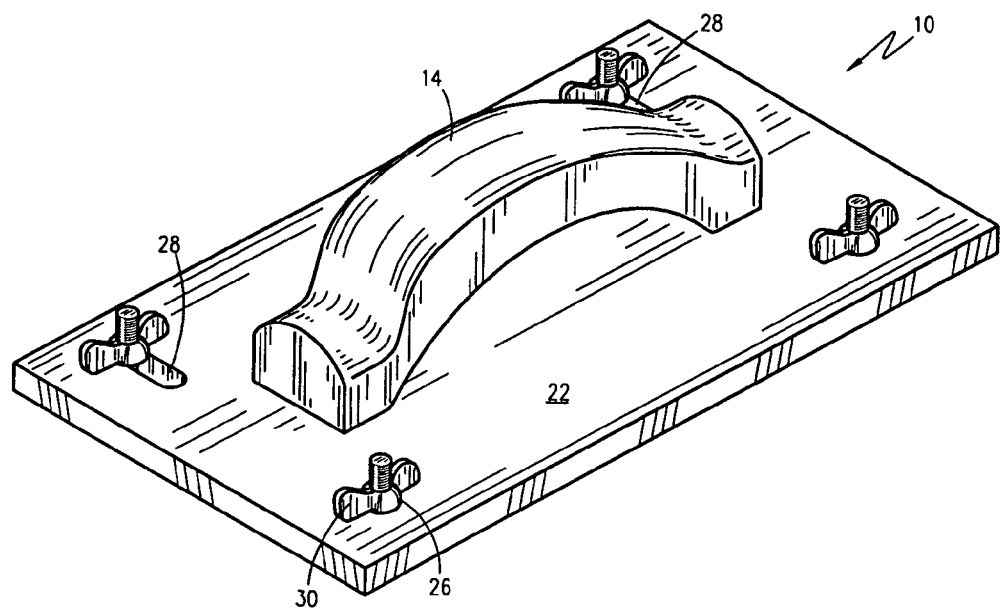
FIG. 2 is a perspective view of the anterior surface of the hand rasp.
Figure 3:
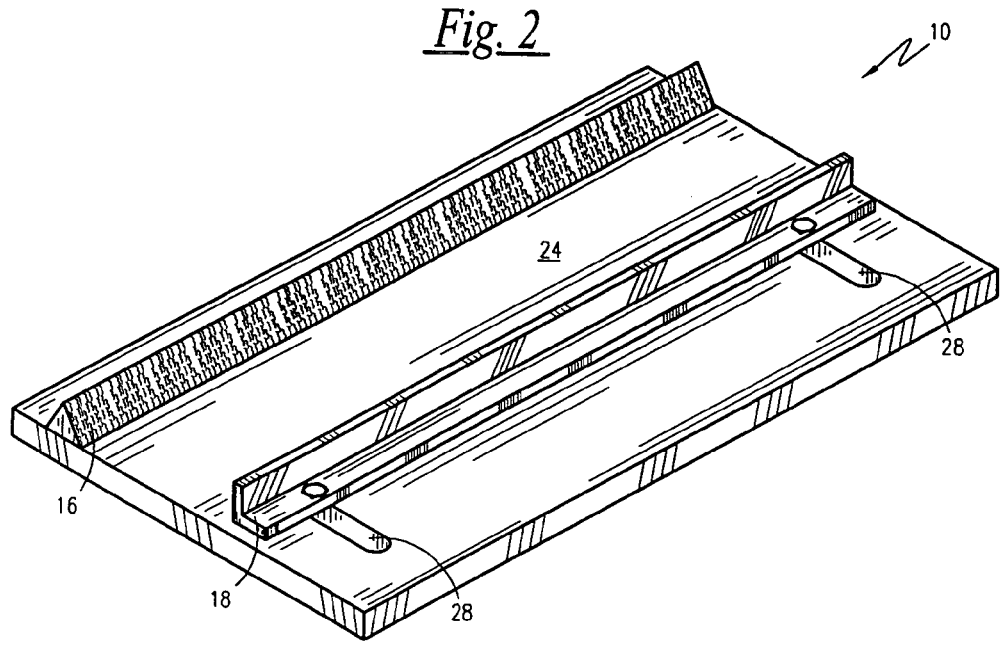
FIG. 3 is a perspective view of the posterior surface of the hand rasp.
Figure 4:
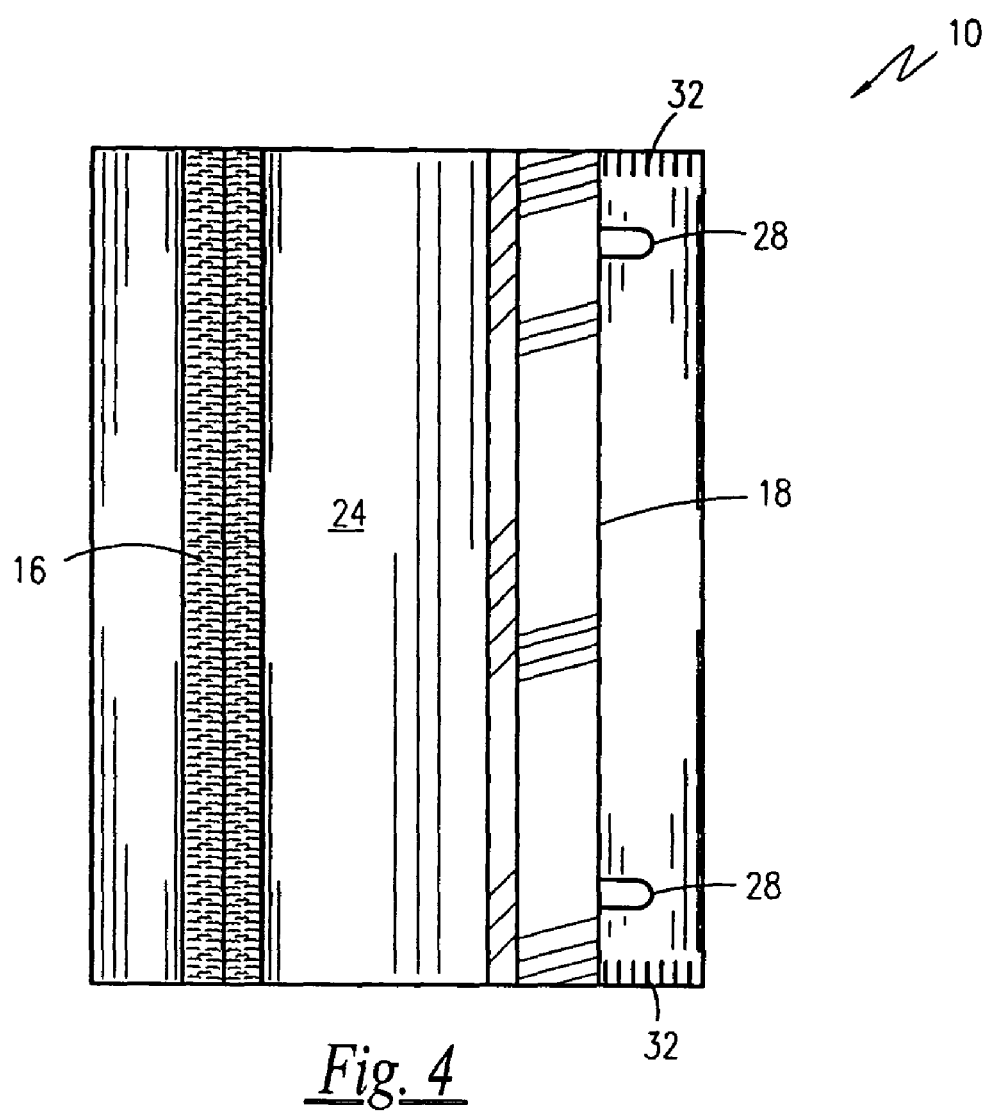
FIG. 4 is a bottom view of the posterior surface of the plate illustrating the incremental measurement hashes provided.
Figure 5A:
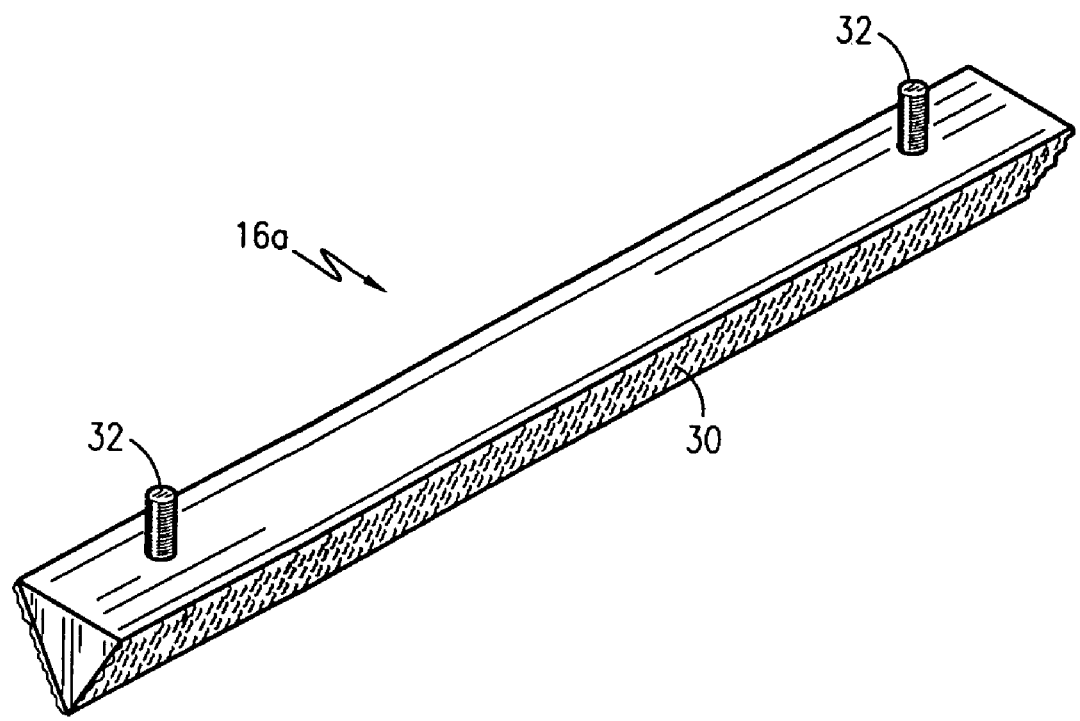
FIG. 5a is a perspective view of a V-shaped groove blade.
Figure 5B:
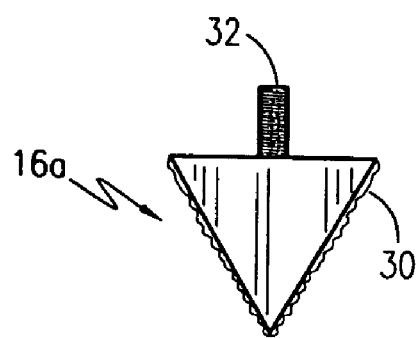
Figure 6A:
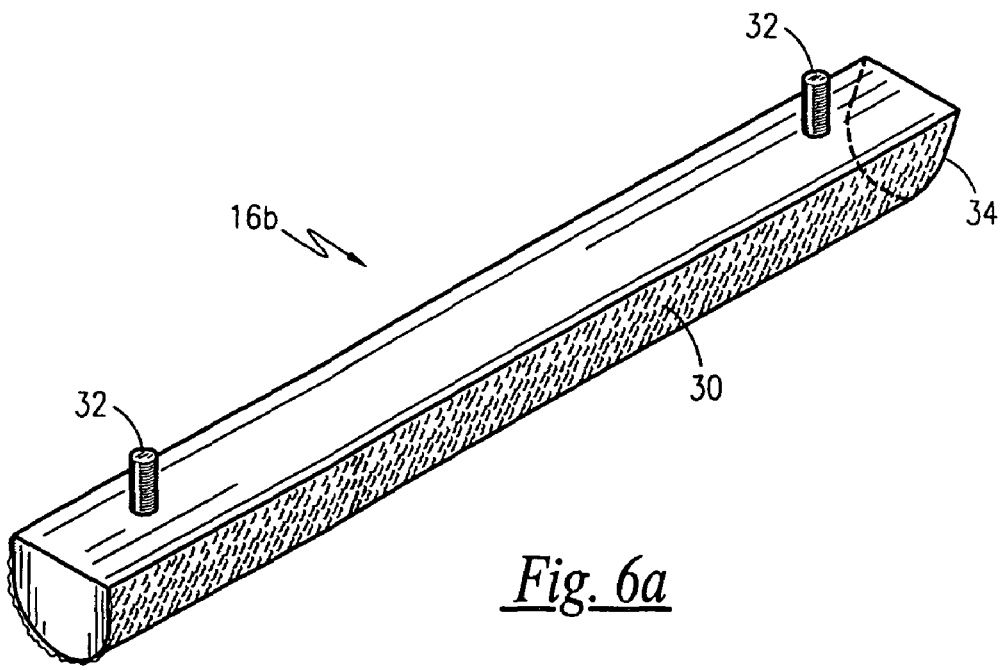
FIG. 6a is a perspective view of a U-shaped groove blade.
Figure 6B:
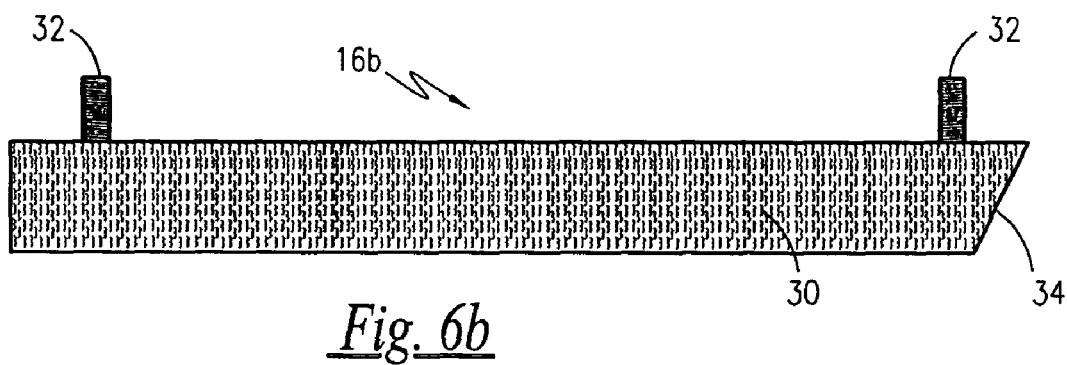
FIG. 6b is a side view of the U-shaped groove blade.
Figure 6C:
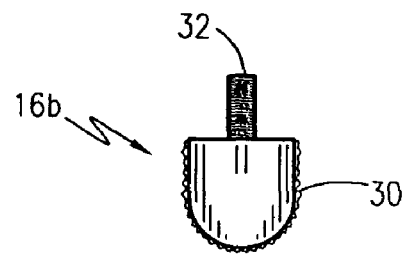
Figure 7A:
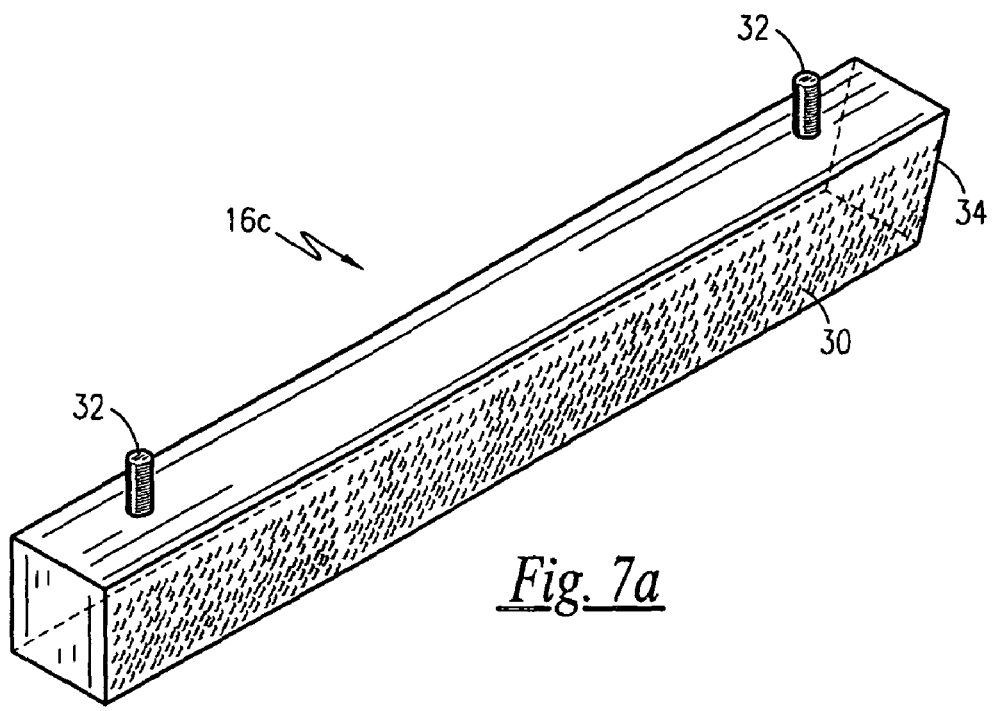
FIG. 7a is a perspective view of a orthogonal-shaped groove blade.
Figure 7B:
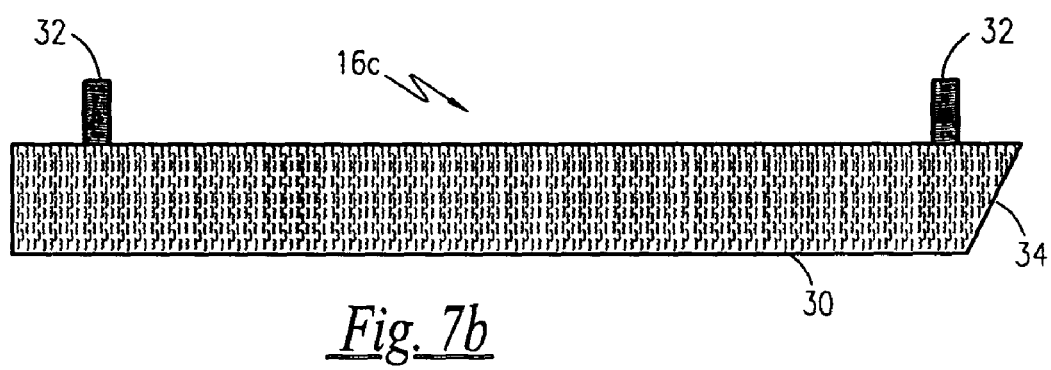
FIG. 7b is a side view of the orthogonal-shaped groove blade.
Figure 7C:
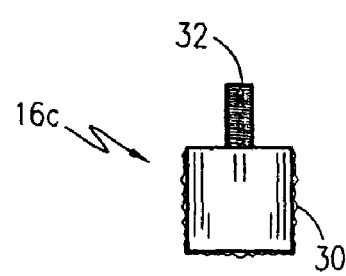
Figure 8A:
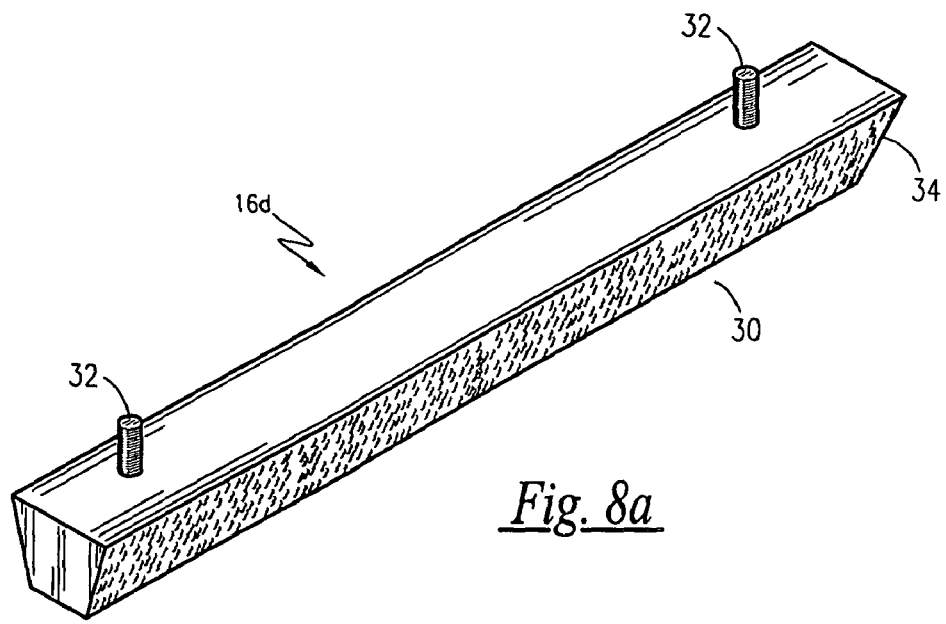
FIG. 8a is a perspective view of a trapezoidal-shaped groove blade.
Figure 8B:
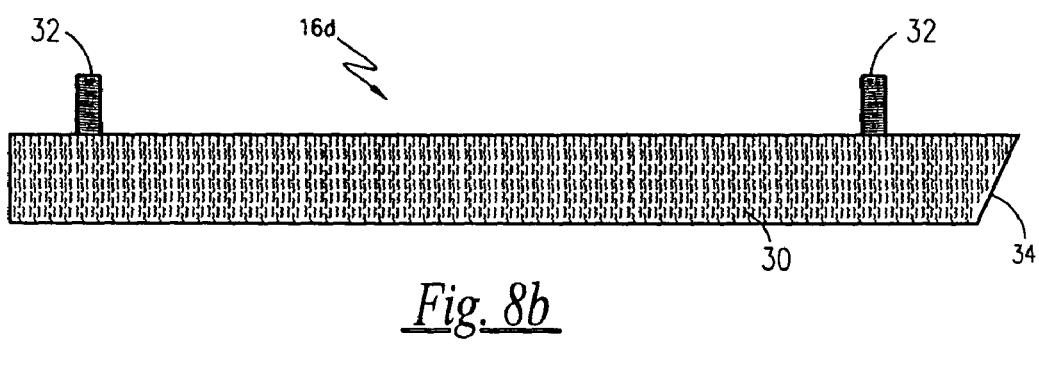
FIG. 8b is a side view of the trapezoidal-shaped groove blade.
Figure 8C:
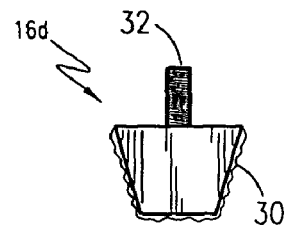
Figure 9A:
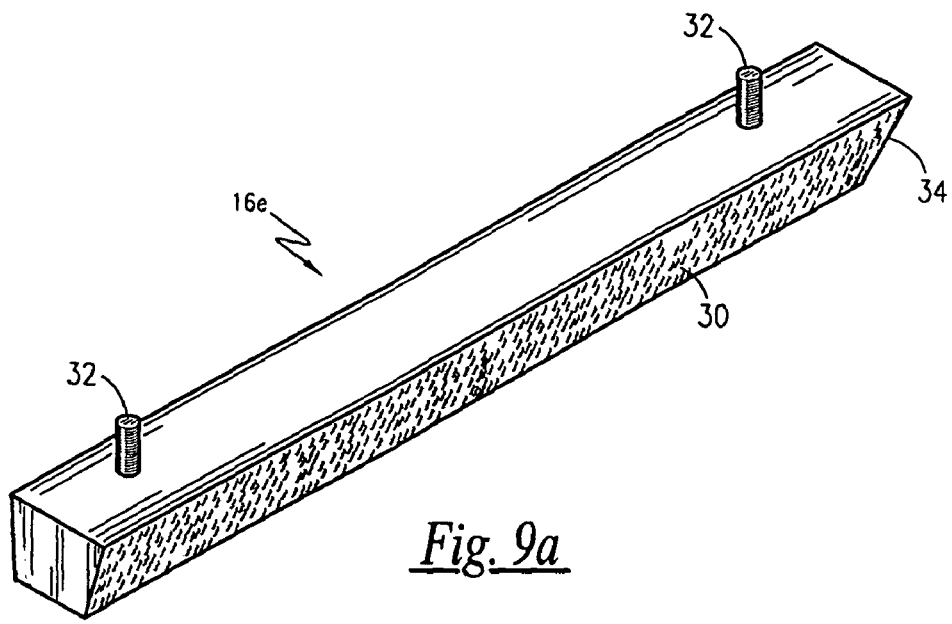
FIG. 9a is a perspective view of a beveled-shaped groove blade.
Figure 9B:
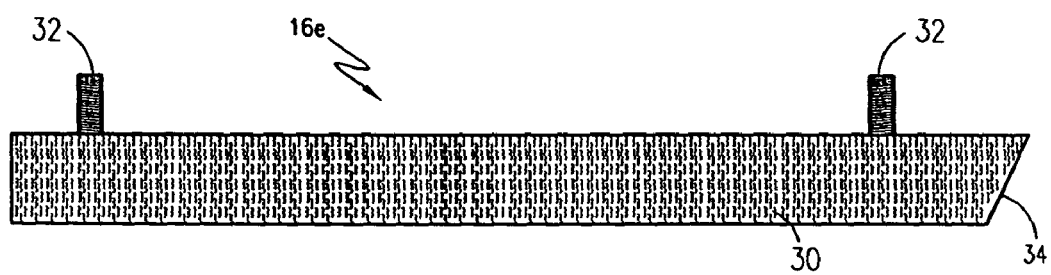
FIG. 9b is a side view of the beveled-shaped groove blade.
Figure 9C:
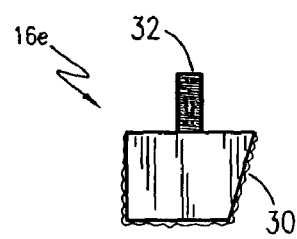
Figure 10:
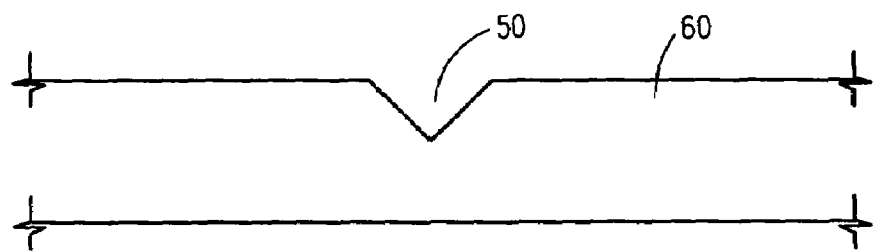
FIG. 10 is a side view of EFIS of varying thickness with a scored groove (shown as a triangular or V-shaped groove).

Referring now to FIG. 1 through FIG. 3, a hand rasp 10 is shown in accordance with a preferred embodiment of the present invention. The hand rasp 10 comprises a planar plate 12 having a grasping handle 14, a groove blade 16 and a guide 18 affixed to the plate 12. The hand rasp 10 scores a groove 50 (see FIG. 10) into an EFIS surface (60), or other similar surface, via the groove blade 16, thereby permitting a plurality of geometric configurations to be formed in a surface, the configurations having either decorative and/or functional grooves 50, which is then covered by at least one exterior coat or surface to exemplify and exaggerate the decorative or functional grooves 50 (as seen in FIG. 10).

The plate 12 comprises an anterior surface 22 and an opposing posterior surface 24 separate by the width of the plate 12. The plate 12 is envisioned as being manufactured from a durable and sturdy material, including steel, aluminum or another similar material. The plate 12 may have a variety of geometric configurations, including the rectangular configuration depicted in the figures. A plurality of apertures 26 and 28 are formed in the plate 12, traversing both the anterior and posterior surfaces 22 and 24. The apertures 26 are provided to receive attachment means 32 of groove blade 16 and guide 18, respectively. The handle 14 is affixed to the plate 12 about the anterior surface 22 in either a permanent or a semi-permanent manner. The handle 14 is envisioned as having a variety of configurations suitable for grasping and capable of withstanding repeated usage and strain associated with tool usage. The handle 14 is also envisioned as having an ergonomic configuration to reduce the strain and/or injury potentially inflicted by use of the hand rasp 10. On the posterior surface 24, a plurality of hashes 32 are provided (see FIG. 4). The hashes 32 are incrementally spaced and preferably labeled with numbers indicating the distance between the groove blade 16 and the guide 18. The distance may be indicated in one of several standards, including inches, centimeters, millimeters or other suitable measurement standards. The hashes 32 permit a user to easily adjust the guide 18 to a desirable distance from the groove blade 16 simply by aligning a linear edge of the guide 18 with the specified hashes 32, thereby eliminating the need for a ruler or tape measure to ensure the right spacing and further eliminating the error(s) that may occur in measuring and adjustment. The hashes 32 are envisioned as integrally etched or stamped on the posterior surface 24 during manufacture for permanent placement of the hashes 32. It is also envisioned that the hashes 32 may be added post-production of the plate 12, and may be added in a variety of manners, including a template adhered to the posterior surface 24 or other suitable means.

The groove blade 16 and the guide 18, respectively, are affixed to the posterior surface 24 of plate 12. The groove blade 16 is an elongated body having an abrasive exterior surface 30 used for scoring a surface. The groove blade 16 may have a plurality of geometric configurations, such as those depicted in FIG. 5a through FIG. 9c, and including a triangulated or V-shaped blade 16a, an arcuate or U-shaped blade 16b, an orthogonal shape 16c, a trapezoidal shape 16d, or a rhomboidal or beveled shape 16e. The width and depth of the groove blade 16, regardless of configuration, is envisioned to encompass standard sizes used in the construction trade, including widths ranging from 0.5 inches (1.27 cm) up to 3 inches (7.62 cm) and depths ranging from 0.25 inches (0.635 cm) up to 1.5 inches (3.81 cm). With the exception of the triangulated or V-shaped blade 16a, the other configurations depicted and envisioned for groove blade 16 includes an angular recess 34 at one terminal end of the elongated body of groove blade 16. The angular recess 34 is provided for the embodiments of 16b through 16e to permit ease of "starting" the groove blade 16 into a surface. Unlike embodiment 16a (with a substantially pointed terminal end), embodiments 16b through 16e are substantially vertically planar and without the angular recess 34, a user may have difficulty in "starting" the score into a surface, resulting in uneven and/or jagged scoring/etching. The groove blade 16 is affixed to the plate 12 by insertion of attachment means 32 through apertures 26 formed in plate 12. Apertures 26 are envisioned as diametrically similar to attachment means 32 so that groove blade 16 is not subject to unnecessary and/or unreasonable lateral and longitudinal reciprocal forces during use. Attachment means 32 includes a variety of screws, bolts, pins or other similar items having threads about which a wing-nut or other standard nut may be threadably secured thereto, thereby securing the groove blade 16 to the plate 12 in a rigidly affixed manner. Attachment means 32 are further envisioned to have a recessed configuration so that the attachment means 32 do not excessive project upward from the anterior surface 22 of plate 12, thereby snagging clothing, material or other objects.

The abrasive exterior surface 30 may be manufactured from a variety of materials, including sandpaper, tungsten, or other similarly abrasive materials. The abrasive exterior surface 30 may be separately adhered to the exterior surface of the groove blade 16 or may be integrally manufactured therein using known manufacturing techniques to incorporate a plurality of spines along the exterior surface of the groove blade 16 to provide the abrasive qualities necessary for the groove blade 16 to score a surface.

The guide 18, like the groove blade 16, is similarly affixed to the posterior surface 24 of plate 12. The guide 18 lies substantially parallel to the groove blade 18 so as to permit uniform scoring/etching of the intended construction material. Attachment means 32 of guide 18 are inserted through elongated apertures 28 formed in the surface of the plate 12. The elongated apertures 28 permit a user to laterally adjust the guide 18 in spacial relationship to the groove blade 18, thereby increasing or decreasing the distance between the groove blade 18 and the guide 18. As depicted, the guide 18 is an L-shaped member wherein one linear side of the "L" is affixed to the plate 12 and the other linear side of the "L" is perpendicularly depending downward from the plate 12. Other embodiments of the guide 18 include only the portion that perpendicularly depends downward, (having a substantial "I" shape) wherein attachment means 32 are integrally incorporated into the top portion of the guide 18 for insertion through the elongated apertures 28. In either the "L" shape or "I" shape, the guide 18 functions to provide a reference by which a user can make precise scores and grooves in the construction material. It is further envisioned that the guide 18 may be removed and an edge of plate 12 (at the side on which the guide 18 is attached to the plate 12) may be used as a guide in combination with a straight-edge device, such as a carpenter's level.

The hand rasp 10 is further capable of scoring, etching, grooving or cutting through cement or mortar based finishes, like those finishes commonly applied to the EFIS after scoring/etching. The cement or mortar is applied to the EFIS, and then a fiber glass mesh support is embedded into the cement or mortar for structural support. Additional coats of cement or mortar are then applied as required. The finished coats harden and are extremely difficult, if not impossible, to modify with hand tools should changes be required. However, the hand rasp 10 is equipped to score/ etch through the hardened base and finish coats further applied to the EFIS, making the hand rasp 10 an extremely versatile hand tool for construction professionals, and overcoming the inability of currently available hand rasps to further modify mortar and finish coats after application to EFIS material.

2. Operation of the Preferred Embodiment

To use the present invention, in accordance with a preferred embodiment of the present invention, a user will affix the appropriate style and size of groove blade 16 (selected from the styles depicted by 16a through 16e) to the posterior surface 24 of plate 12, securing the groove blade 16 via attachment means 32. The guide 18 is thereafter adjusted within the elongated apertures 28 to accommodate the desired distance between groove blade 16 and guide 18. The user will then align the guide 18 along a reference point, and then generate a reciprocating (back-and-forth) motion until the desired groove is scored or etched into the construction material. If desired, the guide 18 may be completely removed and the groove blade 16 guided in a free-hand manner.

In particular, the oval or elliptical shape that is often used to frame the trade name (or trademark) of a business is scored/etched by removing the guide 18 from plate 12. The hand rasp 10 is held at a forty-five degree (45°) angle, and the arcuate or U-shaped groove blade 16b positioned for scoring. The user maintains a forty-five degree (45°) angle so as to form the curvilinear perimeters required by circles, ovals or ellipses. The arcuate groove blade 16b is most preferred for this type of score, as the other available groove blades 16a and 16c through 16e will tend to cause linear protrusions that prevent scoring a uniform curvilinear perimeter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A hand rasp for scoring construction material comprising:
    a planar plate comprising an anterior surface opposite a posterior surface;
    a handle affixed to said anterior surface;
    a groove blade affixed to said posterior surface, said blade comprising an elongated body having an abrasive exterior surface for scoring said construction material; and
    a removable and adjustable guide affixed to said posterior surface, said guide positioned parallel to said blade in a spaced apart relationship.

2. The hand rasp of claim 1, wherein said plate further comprises a plurality of hashes on said posterior surface.

3. The hand rasp of claim 2, wherein said plurality of hashes are incrementally spaced and appropriately labeled by a plurality of measurement standards, said plurality of measurement standards comprising millimeters, centimeters and inches.

4. The hand rasp of claim 3, wherein said plurality of hashes allow uniform adjustment of said guide in relation to said blade.

5. The hand rasp of claim 1, wherein said handle is ergonomic for comfort and control of said hand rasp.

6. The hand rasp of claim 1, wherein said blade comprises a plurality of geometric configurations interchangeably affixed to said plate, said plurality of geometric configurations providing variable scoring aesthetics.

7. The hand rasp of claim 6, wherein said plurality of geometric configurations comprises a triangulated exterior surface for scoring a V-shaped groove in said construction material.

8. The hand rasp of claim 6, wherein said plurality of geometric configurations comprises an arcuate exterior surface for scoring a U-shaped groove in said construction material.

9. The hand rasp of claim 8, wherein said arcuate exterior surface comprises an angular recess at one terminal end of said blade to initiate scoring of said construction material.

10. The hand rasp of claim 6, wherein said plurality of geometric configurations comprises an orthogonal exterior surface for scoring an orthogonal-shaped groove in said construction material.

11. The hand rasp of claim 10, wherein said orthogonal exterior surface comprises an angular recess at one terminal end of said blade to initiate scoring of said construction material.

12. The hand rasp of claim 6, wherein said plurality of geometric configurations comprises a trapezoidal exterior surface for scoring a trapezoidal-shaped groove in said construction material.

13. The hand rasp of claim 12, wherein said trapezoidal exterior surface comprises an angular recess at one terminal end of said blade to initiate scoring of said construction material.

14. The hand rasp of claim 6, wherein said plurality of geometric configurations comprises a beveled exterior surface for scoring a rhomboidal-shaped groove in said construction material.

15. The hand rasp of claim 14, wherein said trapezoidal exterior surface comprises an angular recess at one terminal end of said blade to initiate scoring of said construction material.

16. The hand rasp of claim 6, wherein said blade is affixed to said plate by a plurality of attachment means inserted through a plurality of apertures formed in said plate and secured therein.

17. The hand rasp of claim 1, wherein said guide is affixed to said plate by a plurality of attachment means inserted through a plurality of apertures formed in said plate and secured therein.

18. The hand rasp of claim 17, wherein said guide comprises an L-shaped body.

19. The hand rasp of claim 17, wherein said guide comprises an I-shaped body.

20. The hand rasp of claim 17, wherein said guide is removable, said hand rasp guided by a straight-edged apparatus.

* * * * *